US012223095B2

(12) United States Patent
Deuskar

(10) Patent No.: US 12,223,095 B2
(45) Date of Patent: Feb. 11, 2025

(54) SYSTEMS AND METHODS FOR BLOCKCHAIN-BASED TRACKING AND SELECTIVE ACCESS TO USER DATA

(71) Applicant: Stylitics, Inc., New York, NY (US)

(72) Inventor: Rohan Deuskar, New York, NY (US)

(73) Assignee: Stylitics, Inc., New York, NY (US)

( * ) Notice: Subject to any disclaimer, the term of this patent is extended or adjusted under 35 U.S.C. 154(b) by 543 days.

(21) Appl. No.: 17/692,546

(22) Filed: Mar. 11, 2022

(65) Prior Publication Data

US 2023/0315907 A1 Oct. 5, 2023

(51) Int. Cl.
*G06F 21/62* (2013.01)
*G06F 21/60* (2013.01)
*H04L 9/32* (2006.01)

(52) U.S. Cl.
CPC ........ *G06F 21/6263* (2013.01); *G06F 21/602* (2013.01); *H04L 9/3213* (2013.01)

(58) Field of Classification Search
CPC . G06F 21/6263; G06F 21/602; H04L 9/3213; H04L 9/50
See application file for complete search history.

(56) References Cited

U.S. PATENT DOCUMENTS

| | | | | |
|---|---|---|---|---|
| 10,044,647 | B1* | 8/2018 | Karp | H04L 51/02 |
| 10,154,052 | B1* | 12/2018 | Mcclintock | H04L 67/141 |
| 10,423,999 | B1* | 9/2019 | Doctor | G06Q 30/0631 |
| 11,023,925 | B1* | 6/2021 | Hanafee | G06Q 30/0277 |
| 11,204,971 | B1* | 12/2021 | Vilcinskas | G06Q 10/105 |
| 11,361,346 | B1* | 6/2022 | Modi | G06Q 30/0643 |
| 2012/0198026 | A1* | 8/2012 | Roy | G06F 3/0482 709/217 |
| 2014/0282881 | A1* | 9/2014 | Li | H04L 67/02 726/4 |
| 2014/0337714 | A1* | 11/2014 | Mu | H04L 67/535 715/234 |
| 2016/0019464 | A1* | 1/2016 | Madhavan | H04W 4/18 706/11 |
| 2017/0249394 | A1* | 8/2017 | Loeb | H04L 63/0407 |
| 2017/0331828 | A1* | 11/2017 | Caldera | H04L 63/0807 |
| 2018/0253430 | A1* | 9/2018 | Grigorescu | G06Q 50/01 |
| 2019/0122258 | A1* | 4/2019 | Bramberger | G06N 3/08 |
| 2019/0281030 | A1* | 9/2019 | Isaacson | H04L 63/0838 |
| 2019/0392019 | A1* | 12/2019 | Brannon | G06F 16/215 |
| 2020/0004986 | A1* | 1/2020 | Brannon | G06F 3/0482 |

(Continued)

*Primary Examiner* — Javier O Guzman
(74) *Attorney, Agent, or Firm* — Ansari Katiraei LLP; Arman Katiraei; Sadiq Ansari

(57) ABSTRACT

Disclosed is a blockchain cookie token for tracking user data compiled from different merchants on the blockchain, and for providing virtual and physical merchants selective access to the user data via the blockchain. Each blockchain cookie token may be generated for a different user, and may be accessed using a different key. The key may be provided to different network sites. A first set of user data, derived from tracked activity of the particular user at a first network site, may be entered into the token. The first set of user data provided by the first network site may be accessed at a different second network site using the key, and the second network site may customize content that is presented to the user based on one or more content of the second network site having attributes that match the first set of user data entered in the token.

19 Claims, 9 Drawing Sheets

(56) References Cited

U.S. PATENT DOCUMENTS

| | | | |
|---|---|---|---|
| 2020/0278844 A1* | 9/2020 | Chauhan | G06F 8/38 |
| 2020/0294033 A1* | 9/2020 | Wilson | G06Q 20/0658 |
| 2021/0390196 A1* | 12/2021 | Lavine | H04L 63/102 |
| 2021/0390531 A1* | 12/2021 | Voorhees | G06Q 20/367 |
| 2022/0005053 A1* | 1/2022 | Gurugubelli | G06Q 30/0269 |
| 2024/0211923 A1* | 6/2024 | Doumar | G06Q 20/3276 |

* cited by examiner

SYSTEMS AND METHODS FOR BLOCKCHAIN-BASED TRACKING AND SELECTIVE ACCESS TO USER DATA

BACKGROUND

Browser cookies are a prevalent way by which different sites track user data. Many sites do not share their tracked user data with other sites, and the browser cookies generated by visits to a particular merchant site cannot be used offline at brick-and-mortar stores of the same particular merchant. Moreover, the user often has no knowledge or control of the data that different merchants collect on the user.

DETAILED DESCRIPTION OF PREFERRED EMBODIMENTS

The following detailed description refers to the accompanying drawings. The same reference numbers in different drawings may identify the same or similar elements.

Systems and methods, in accordance with the embodiments set forth herein, may track user data compiled from different merchants on the blockchain, and may provide virtual (e.g., online) and physical (e.g., brick-and-mortar) merchants selective access to the user data via the blockchain. The systems and methods may include generating a singular token on the blockchain that may track preferences, purchases, and/or other data of a particular user. Two or more merchants and/or third parties may contribute to the user data that is stored to the blockchain token. Moreover, the two or more merchants and/or third parties may access the user data from the same blockchain token to customize the user experience at their respective sites and/or physical storefronts. Accordingly, the blockchain token may represent a cryptographically secure cookie that stores user data collected by different merchants in one location and that no single merchant has control over.

In some embodiments, the user may control which merchants have access to the token by selectively providing the token identifier or key to merchants of the user's choosing. The merchants that receive the token identifier or key may access the tracked user data to then customize the user experience across different their sites. In some embodiments, a user may present the token identifier or key to a kiosk, sales associate, and/or device at a brick-and-mortar store of a merchant, and may receive a customized experience at the physical store based on the current inventory of the store and the user data tracked to the token.

In some embodiments, the same token may be accessed with read and write permissions via a first identifier or key, and with read permissions via a second identifier or key. In some such embodiments, the user may restrict which merchants are permitted to add user data to the token by selectively providing one of the first token identifier or the second token identifier to different merchants.

In some embodiments, the user may control what data the merchants are permitted to track in the token by generating the token as a smart contract. The smart contract may include code for enforcing a set of rules whenever a merchant attempts to add to or update the token, and the set of rules may control the user data that may be added, updated, and/or accessed from the token by different merchants. For instance, the smart contract may prevent personal identifying information or purchase history information from being added, and may restrict the token to include non-identifying data such as color preferences, style preferences, and/or price preferences of the user.

Figure 1:
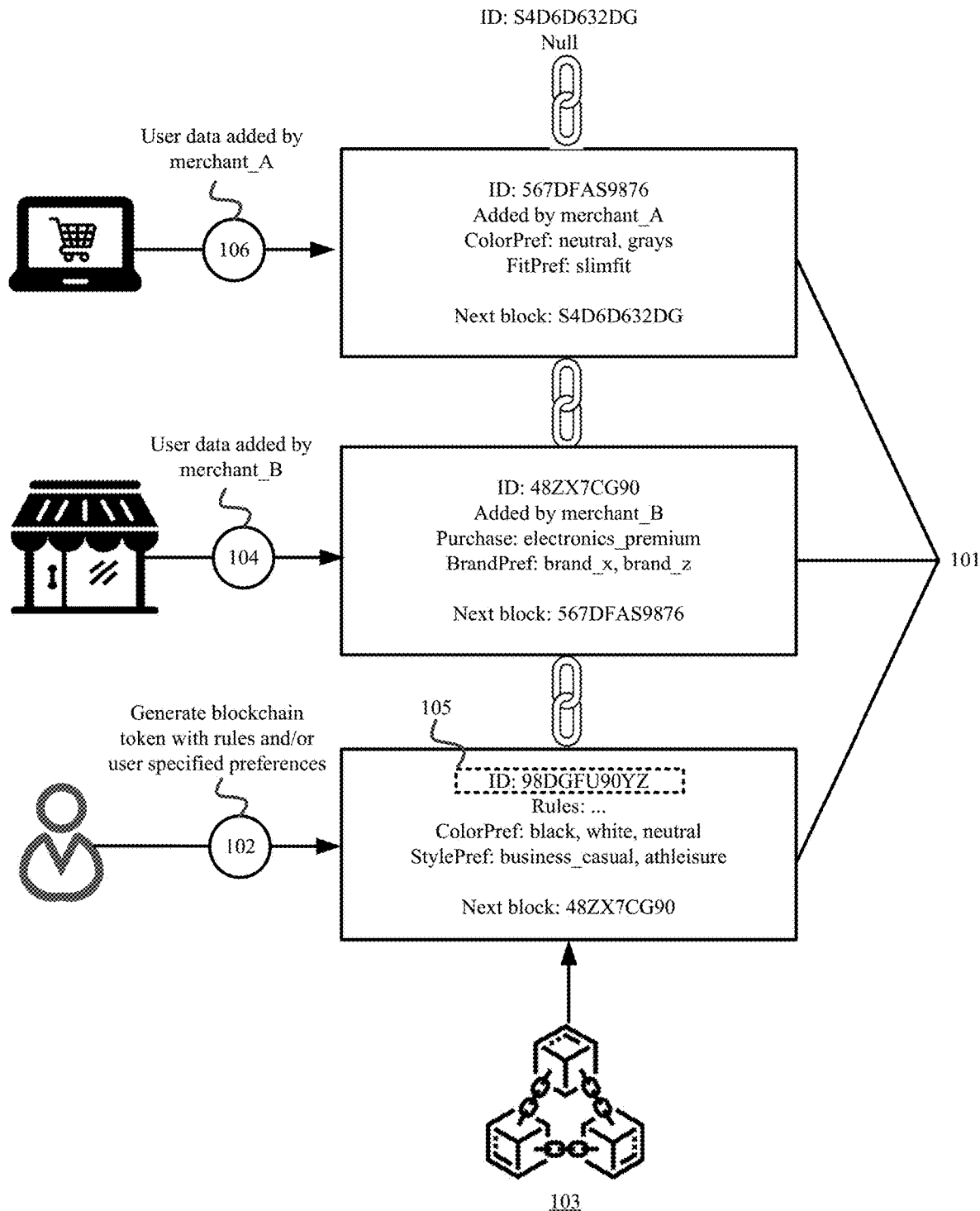
FIG. 1 illustrates an example of a blockchain cookie token that provides shared access to user data across different merchant sites in accordance with some embodiments presented herein.

FIG. 1 illustrates an example of a blockchain cookie token that provides shared access to user data across different merchant sites in accordance with some embodiments presented herein. As shown in FIG. 1, blockchain cookie token 101 may be created for a particular user on blockchain 103.

Blockchain cookie token 101 may include a smart contract, data record, and/or other block on blockchain 103. In some embodiments, blockchain cookie token 101 may store different user preferences, purchase history, browsing history, clicks, visited content, and/or other user data that different merchants have tracked for the particular user.

In some embodiments, blockchain cookie token 101 may include a linked list of smart contracts, data records, and/or other blocks with each block storing one or more rules, preferences, purchase history, and/or other user data for the particular user. The rules may specify the preferences, purchases, activity, interactions, and/or other user data that may be added to blockchain cookie token 101, as well as acceptable values for the user data. For instance, the rules may permit non-identifying purchase history to be added to blockchain cookie token 101, wherein the non-identifying purchase history prevents specific identification of a purchased good from being recorded, but permits recording of a purchased category type.

A first block or origin block of blockchain cookie token 101 may be generated (at 102) in response to a request from the particular user. The first block may include origin key 105 for accessing blockchain cookie token 101 and all blocks that are subsequently added or linked to the first block. Origin key 105 may include a unique sequence of alphanumeric characters that represent an address or identifier for the first block associated with blockchain cookie token 101 on blockchain 103. The first block may also include smart contract rules and/or code for user data that may be added to or associated with blockchain cookie token 101, and/or user data that the particular user adds to blockchain cookie token 101.

Each subsequent block of blockchain cookie token 101 may be generated (at 104 and 106) by a different merchant that has access to blockchain cookie token 101 and/or at different times when new or updated user data is tracked by that merchant based on actions and/or interactions that the particular user has with that merchant or other sites monitored by that merchant. When new user data is added to or associated with blockchain cookie token 101, a next block may be created and linked to the last generated block of blockchain cookie token 101. Specifically, each block of blockchain cookie token 101 may include the unique key for the next added block of blockchain cookie token 101, and the last or most recent block may include a unique key or identifier to a future block that does not yet exist on blockchain 103. The future block may be created on blockchain 103 when new or updated user data is added to blockchain cookie token 101. Once created on blockchain 103, the future block may include a unique key for a next future block of blockchain cookie token 101. Accordingly, the user data stored by blockchain cookie token 101 may be stored in multiple blocks that may be traversed by starting from origin key 105 of the first block, and accessing the unique identifier or key of each next block until arriving at a last block where the unique identifier or key for the next block is a null pointer or points to a block that does not yet exist on blockchain 103.

Accordingly, blockchain cookie token 101 may be an immutable account of user data that different merchants compile on the particular user over time. Although the user data in blockchain cookie token 101 may be immutable, it is possible to override an old value with a new value for a particular preference or instance of user data by creating a second entry for that particular preference or instance of user data with the new value in blockchain cookie token 101. This also allows different merchants to track different values for the same particular preference in blockchain cookie token 101. In other words, a first merchant may use a first value for a particular preference that the first merchant added to blockchain cookie token 101 when the first merchant customizes content for the particular user, and a second merchant may use a second value for the same particular preference that the second merchant added to blockchain cookie token 101 when the second merchant customizes content for the particular user.

The particular user may control which merchants have access to blockchain cookie token 101 by selectively exposing origin key 105 to merchants of the particular user's choosing. For instance, the particular user may access a first site of a first merchant using a web browser or other application, may create a first account, and may associate origin key 105 for blockchain cookie token 101 with the first account.

The particular user may search for, interact with, and/or spend time viewing different content on the first site. The first merchant may determine one or more user preferences based on the searches, interactions, and time spent on the first site, may compare the one or more user preferences to preferences already tracked in blockchain cookie token 101, and may enter new or updated preferences to blockchain cookie token 101 by creating a new block that is linked to the last generated block of blockchain cookie token 101.

The particular user may access a second site of a second merchant that is unrelated to the first site or the first merchant. The particular user may create a second account, and may associate origin key 105 of blockchain cookie token 101 with the second account. The second site may customize the user experience based on one or more of the retrieved user data from blockchain cookie token 101 that is relevant to the second site or the second merchant even if the particular user has never visited the second site and/or the second site has no prior tracked user data for the particular user. In other words, the second merchant may customize the second site based on the user data tracked to blockchain cookie token 101 by the first merchant, other merchants, and/or the particular user.

Figure 2:
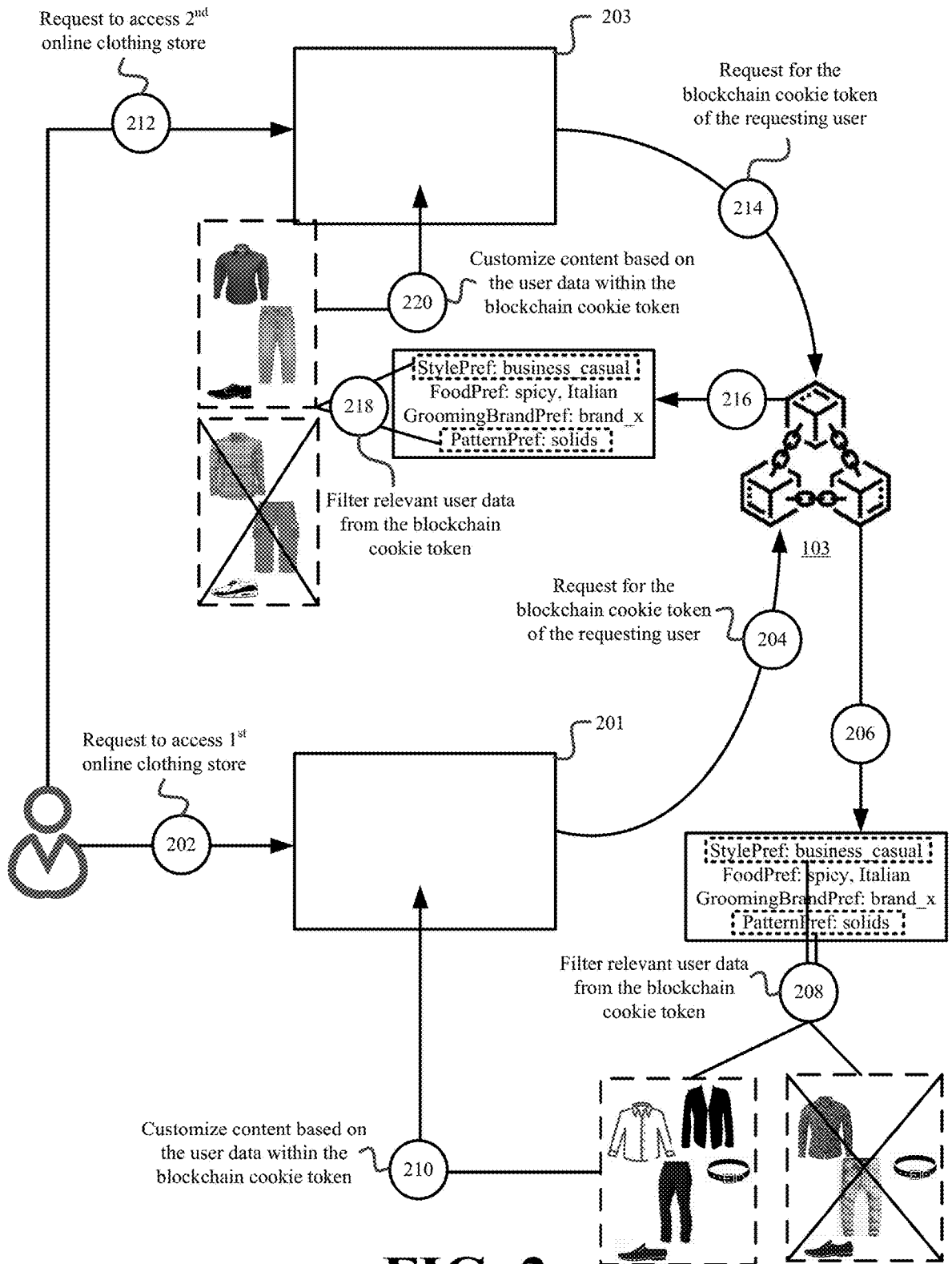
FIG. 2 illustrates an example of customizing the user experience at different sites based on the user data from a blockchain cookie token in accordance with some embodiments presented herein.

FIG. 2 illustrates an example of customizing the user experience at different sites based on the user data from blockchain cookie token 101 in accordance with some embodiments presented herein. A particular user may issue (at 202) a request to access first online clothing store 201. The request may include the origin key for a blockchain cookie token of the particular user, or may include identifying information about the particular user that may be linked to the origin key for the blockchain cookie token of the particular user.

First online clothing store 201 may issue (at 204) a request to blockchain 103 for the blockchain cookie token associated with the origin key, and may retrieve (at 206) the user data stored within the blockchain cookie token from blockchain 103. Specifically, first online clothing store 201 may use the origin key to retrieve the first block of the blockchain cookie token from blockchain 103, and may read the user data from all blocks that are linked to the first block. First online clothing store 201 may filter (at 208) the user data to extract one or more preferences that are relevant to goods and services of first online clothing store 201. For instance, the blockchain cookie token may track the particular user's preferences for spicy food, Italian food, business-casual clothing, a particular brand of grooming products, and solid patterns. First online clothing store 201 may extract (at 208) the business-casual clothing preference and the solid pattern preference.

First online clothing store 201 may customize (at 210) the site and/or user experience based on the filtered (at 208) and relevant user data from the blockchain cookie token of the particular user. For instance, first online clothing store 201 may present (at 210) a first set of business-casual clothing items with solid patterns from first online clothing store's 201 available inventory, and may remove or deprioritize clothing items of other styles. Accordingly, the particular user may receive a different page or content upon accessing first online clothing store 201 than another user based on the different user data contained in the particular user's blockchain cookie token.

As shown in FIG. 2, the particular user may then navigate to and issue (at 212) a request to second online clothing store 203. Second online clothing store 203 may receive the origin key for the blockchain cookie token of the particular user, may query (at 214) blockchain 103 using the origin key, may retrieve (at 216) the user data from the blockchain cookie token, and may extract (at 218) the relevant user data (e.g., business-casual clothing preference and solid pattern preference) from the blockchain cookie token. The different online clothing stores may therefore have access to the same user data, but may customize their content differently based on different available inventory. For instance, second online clothing store 203 may customize (at 220) the site to present a different second set of business-casual clothing items with solid patterns from second online clothing store's 203 available inventory.

In this manner, the blockchain cookie token may serve as a singular record of the particular user's preferences that may be shared amongst and/or selectively accessed by different merchants. Large and popular merchants no longer have an uneven playing field with more user data to better customize their content over smaller and less popular merchants. The blockchain cookie token may provide the smaller and less popular merchants access to the same user data regardless of whether the smaller and less popular merchants or other merchants compiled that user data, and regardless of whether the user has previously visited sites operated by the smaller and less popular merchants.

The customized user experience and the time saved in receiving content that is tailored to one's preferences may be sufficient incentive for users to provide different merchants access to the user's blockchain cookie token. For instance, a user may receive customized content that is tailored to that user's preference upon landing on first online clothing store 201 and second online clothing store 203 without the user having to submit search queries or perform a series of selections for business-casual clothing with solid patterns. The customized user experiences may occur automatically based on the user data that is tracked to the blockchain cookie token, and that the user selects to share with sites 201 and 203 by exposing the origin key for the blockchain cookie token to those sites 201 and 203.

In some embodiments, the merchants may provide additional incentive to persuade users to provide their blockchain cookie tokens. For instance, a merchant may offer a 10% discount after a user provides their blockchain cookie token to that merchant. The merchant may reference the user data from blockchain cookie token to better customize the experience for the user, and thereby increase the likelihood of presenting the user with desired content and/or content that the user is more likely to purchase. Accordingly, the customized user experience based on the individual user data from the blockchain cookie token may lead to sales that may otherwise have been missed when presenting the same and/or generic content to all users.

Figure 3:
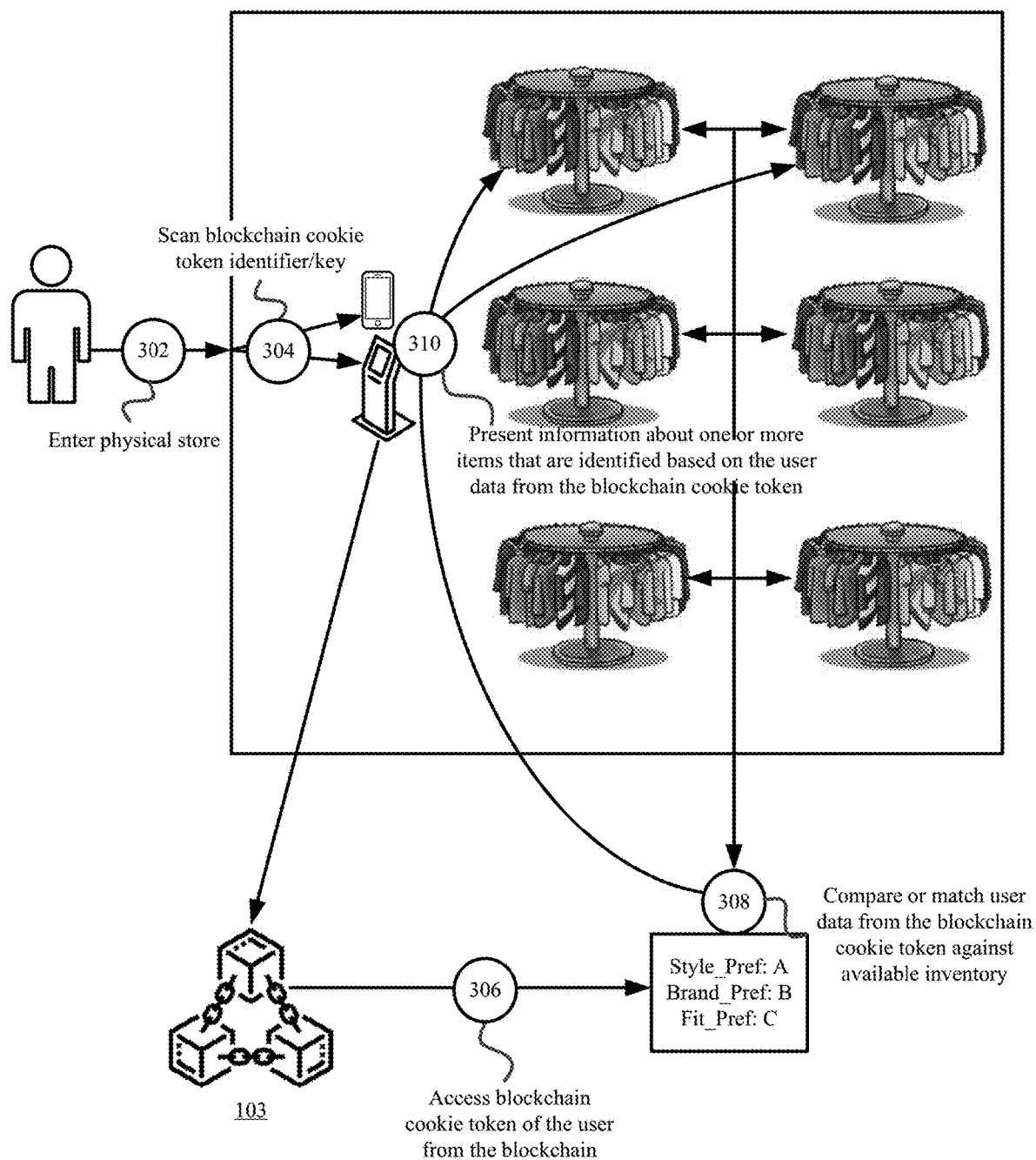
FIG. 3 illustrates an example of using a blockchain cookie token at a physical store location in accordance with some embodiments presented herein.

The blockchain cookie token may have offline applications and/or may be used in brick-and-mortar or physical stores. FIG. 3 illustrates an example of using a blockchain cookie token at a physical store location in accordance with some embodiments presented herein. A user may enter (at 302) a large department store with several clothing styles (e.g., athleisure, formal, business, business-casual, casual, gothic, boho, etc.) from different brands and for different sizes and shapes (e.g., slim-fit, baggy, broad shoulder, big & tall, etc.).

The user may spend several minutes walking around the department store to find the clothing style, brand, and size and shape of their preference. Instead, the user may scan (at 304) or present the key for their blockchain cookie token to a sales associate, a kiosk, and/or other device. The user preferences for a particular clothing style from a particular brand with a particular fit may be retrieved (at 306) by accessing the blockchain cookie token identified by the provided key on blockchain 103.

The user preferences may be compared (at 308) and/or matched against a mapping of items in the department store in order to determine where one or more items of the particular clothing style from the particular brand with the particular fit may be found. The sales associate, kiosk, and/or other device may then present (at 310) images and/or information about the one or more items, provide directions and/or other instructions for the location of the one or more items, and/or identify where the particular clothing style from the particular brand with the particular fit may be found.

In some embodiments, the merchants may provide more intelligent recommendations based on the user data in the blockchain cookie token. The intelligent recommendations may be in the form of a digital or virtual personalized stylist for a particular user at a physical store location.

Figure 4:
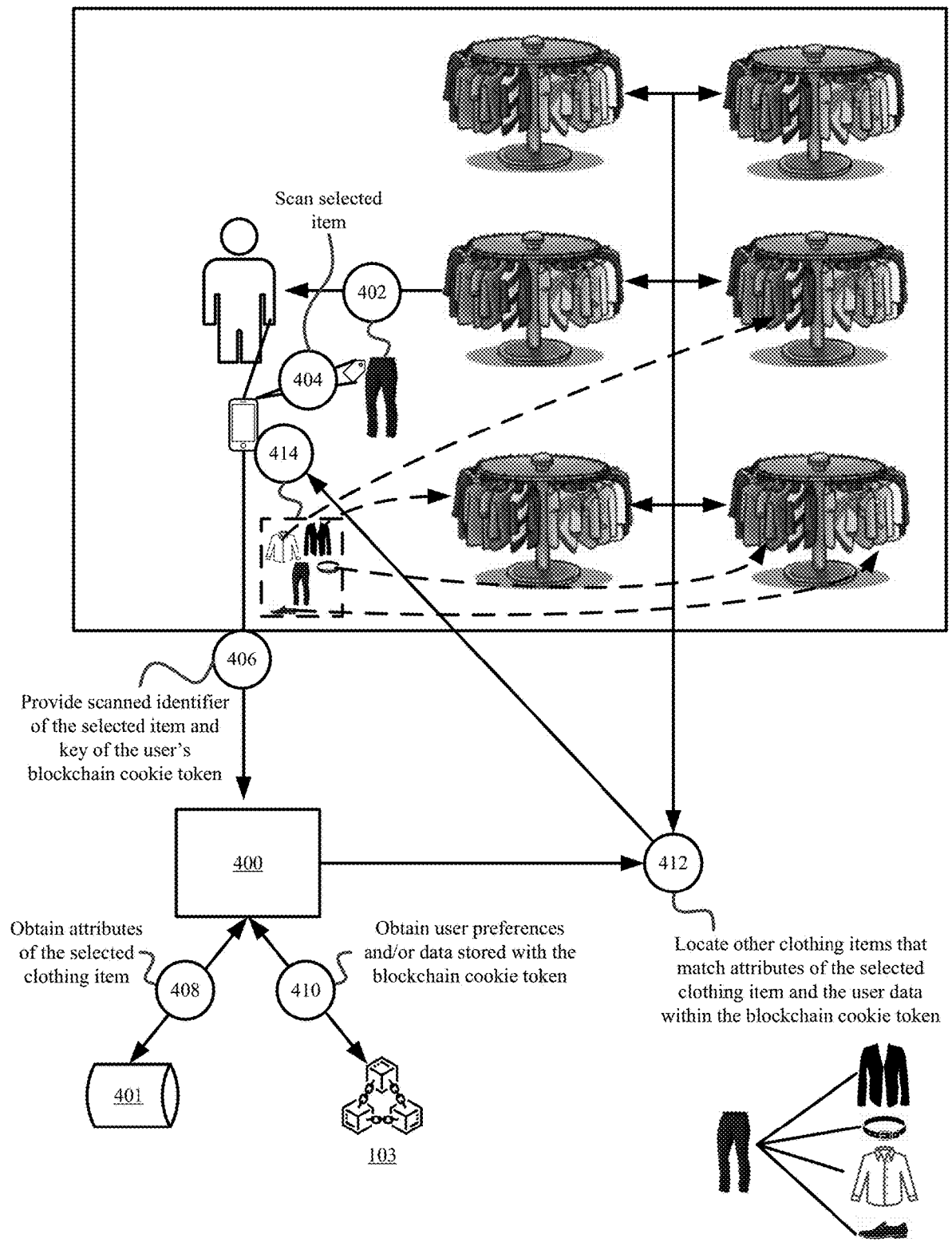
FIG. 4 illustrates an example of providing a virtual personalized stylist at a physical store using the user data within a blockchain cookie token in accordance with some embodiments presented herein.

FIG. 4 illustrates an example of providing a virtual personalized stylist at a physical store using the user data within a blockchain cookie token in accordance with some embodiments presented herein. The user may enter a store and may select (at 402) a clothing bottom that they like. The user may open a virtual stylist site or application associated with the store on a network-enabled device of the user or a kiosk at the store. The virtual stylist site or application may be linked to the blockchain cookie token of that user via an earlier configuration of the site or application or by providing the key associated with the blockchain cookie token to the site or application.

The user may use a camera or scanner of the device to scan (at 404) a tag or label of the selected clothing bottom. Virtual stylist system 400 may receive (at 406) the scanned tag or label of the selected clothing bottom as well as the key for the configured user blockchain cookie token.

Virtual stylist system 400 may perform a first lookup using a first identifier from the scanned tag or label of the selected clothing bottom to obtain (at 408) attributes of the selected clothing bottom from item database 401, and may perform a second lookup using the blockchain cookie token key to obtain (at 410) the user data contained within the user's blockchain cookie token from blockchain 103.

Virtual stylist system 400 may generate (at 412) a personalized outfit with other clothing items (e.g., a clothing top, jacket, socks, shoes, hat, jewelry, etc.) that satisfy or match user preferences found in the blockchain cookie token and that satisfy or match the attributes of the selected clothing bottom. In other words, virtual stylist system 400 may style the clothing bottom selected by the user with other items based on the look of the selected clothing bottom and the user data.

Virtual stylist system 400 may present (at 414), on the user device, the personalized outfit to illustrate the pairing of the selected clothing bottom with the other recommend items in a single visualization. Additionally, virtual stylist system 400 may provide (at 414) pricing, descriptions, and/or other information about the recommended items.

The user may request virtual stylist system 400 to generate alternative outfits via swipe gestures and/or other inputs issued to the user device, or may select the personalized outfit via a particular input. In response to the user selecting the personalized outfit, virtual stylist system 400 may identify the location in the store for each recommended item from the personalized outfit. Accordingly, the user may receive (at 414) personalized recommendations for pairing one or more items selected by the user with one or more other items in the store that match tracked preferences of the user without the user having to browse the entire store and randomly pick different items to pair with the selected items.

Virtual stylist system 400 may save the user time in finding desired items while also prioritizing and displaying the items that best match to the tracked user data and that might otherwise be missed by the user if those items are distributed throughout different racks or shelves amongst other items that do not match the user's preferences. In other words, the user may be overwhelmed by the number of options in the store, may not know what they are looking for, may not have a sophisticated understanding of what item best complements another item and their own preferences, and/or may not have the time or patience to look through all potential matches. Virtual stylist system 400 may resolve such issues by customizing and/or focusing the user experience based on their tracked preferences, attributes of items the user has already selected, and/or attributes of matching or related store inventory.

Despite some similarities to HyperText Transfer Protocol ("HTTP") cookies, browser cookies, and/or other online tracking tokens, the blockchain cookie token set forth herein differs by providing the user control of what and how much user data is tracked, who may track the data, and/or who may access the data. In other words, the blockchain cookie token shifts control over the user data from the merchants to the users.

Figure 5:
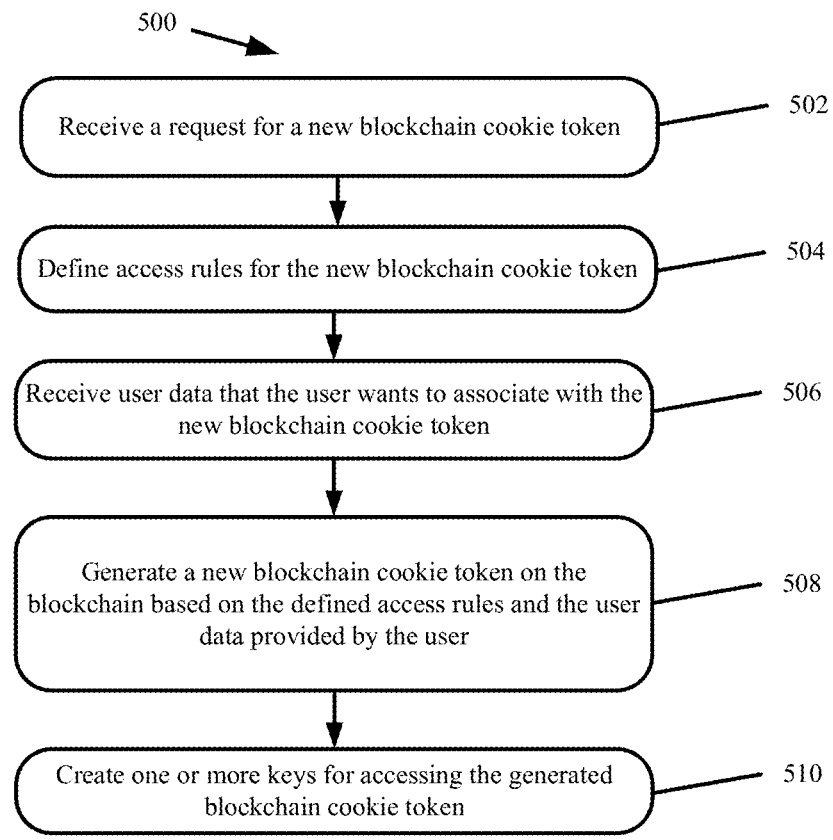
FIG. 5 presents a process for generating a blockchain cookie token for a user that the user controls in accordance with some embodiments presented herein.

FIG. 5 presents a process 500 for generating a blockchain cookie token for a user that the user controls in accordance with some embodiments presented herein. Process 500 may be implemented on the blockchain via a blockchain cookie token generation interface, portal, and/or system. For instance, the blockchain cookie token generation system may define the token format and/or rules that control what data is tracked, who may add user data, and/or who may access the user data. The blockchain may include one or more distributed, decentralized, and/or public ledgers that support smart contracts.

Process 500 may include receiving (at 502) a request for a new blockchain cookie token. For instance, a user may submit an HTTP request or other network message to the blockchain cookie token generation system requesting the creation of a new blockchain cookie token. In some embodiments, the user may request different blockchain cookie tokens for use with different sites. For instance, a user may request a first blockchain cookie token for use with a first set of merchants that sell consumer goods, and may request a second blockchain cookie token for use with a second set of merchants that are restaurants and/or provide professional services (e.g., masseuse, doctors, repairmen, etc.).

Process 500 may include defining (at 504) access rules for the new blockchain cookie token. Defining (at 504) the access rules may include defining rules that restrict the type of user data that may be associated with the blockchain cookie token, the entities that may add user data to the blockchain cookie token, the entities that may access the user data, and/or specific sets of user data that each entity may access. More specifically, the access rules may specify which preferences, purchase history, browser history, user actions, and/or other user activity may be tracked, and may also specify supported values for each of the tracked preferences, purchase history, browser history, user actions, and/or other user activity. The access rules may ensure that the tracked user data is anonymized and/or does not include any identifying or private data. For instance, a first access rule may allow merchants to track exactly what item was purchased from a particular seller at the exact sale price, and a second access rule may allow merchants to track non-identifying user preferences such as preferred colors, patterns (e.g., solid, stripped, checkered, etc.), clothing style, brand, and the like. In some embodiments, the access rule may be defined as acceptable key-value pairs or expressions for trackable user data. The access rules therefore prevent merchants from adding and/or tracking any user data of their choosing, and are instead limited to tracking user data that complies with the user-defined access rules.

The access rules may further include identifiers for merchants permitted to add to and/or access the tracked user data. In some embodiments, the identifiers may include categories. For instance, clothing stores may be permitted to track and access user data, whereas furniture stores may be limited to only access the user data. In some embodiments, the identifiers may include names, domain name, Uniform Resource Locators ("URLs"), network addresses, and/or other values for differentiating between different merchants.

Process 500 may include receiving (at 506) user data that the user wants to associate with the new blockchain cookie token. For instance, the user may initially populate the blockchain cookie token with certain preferences that merchants may add to over time.

Process 500 may include generating (at 508) a new blockchain cookie token on the blockchain based on the defined access rules and the user data provided by the user. In some embodiments, generating (at 508) the new blockchain cookie token may include writing the access rules to a smart contract, and entering the smart contract as a first block or origin block of the new blockchain cookie token. For instance, the access rules may be defined as code that is executed and enforced whenever the blockchain cookie token is accessed. If a merchant attempts to add user data with an unsupported value that violates one or more of the access rules, the smart contract code may detect and prevent the unsupported value from being added to the blockchain cookie token. Similarly, if a merchant without permission attempts to access the user data within the blockchain cookie token, the smart contract code may detect and prevent that merchant from reading and/or decrypting the user data stored within the blockchain cookie token.

Process 500 may include creating (at 510) one or more keys for accessing the generated blockchain cookie token. In some embodiments, a first key may be kept private by the user and may be used to add or modify the access rules enforced by the blockchain cookie token, and a second key may be exposed to different merchants to allow the merchants to read and/or write user data to the blockchain cookie token based on the access rules associated with the smart contract code of the blockchain cookie token.

In any case, the keys may be identifiers or addressing for accessing the first block of the newly created blockchain cookie token on the blockchain. The first block may further include a reserved key, identifier, or address for a next block of the blockchain cookie token. However, since the next block has yet to be created, the reserved key may be a null pointer. The null pointer May indicate that the end of the blockchain cookie token has been reached. Once additional user data is added to the blockchain cookie token, the next block may be generated with the additional user data, and may be linked to the first block via the reserved key. In other words, the reserved key may be used to address and/or access the next block. The next block will have its own unique reserved key as a null pointer, and that reserved key will be used to access another block of the blockchain cookie token when additional user data is subsequently added.

In some embodiments, the access rules from the first block of the blockchain cookie token may be automatically entered and/or included with each subsequent block of the same blockchain cookie token. This ensures that the access rules are enforced whenever new user data is added to blockchain cookie token.

In some embodiments, new access rules may be added by the user to additional blocks of the blockchain cookie token. In some such embodiments, new user data is validated against the original access rules in the first block of the blockchain cookie token and against any other access rules that are included in other blocks of the blockchain cookie token. Accordingly, the blockchain cookie token may include a series of smart contracts that each have their own set of access rules against which any new user data is validated before being added to the blockchain cookie token.

Figure 6:
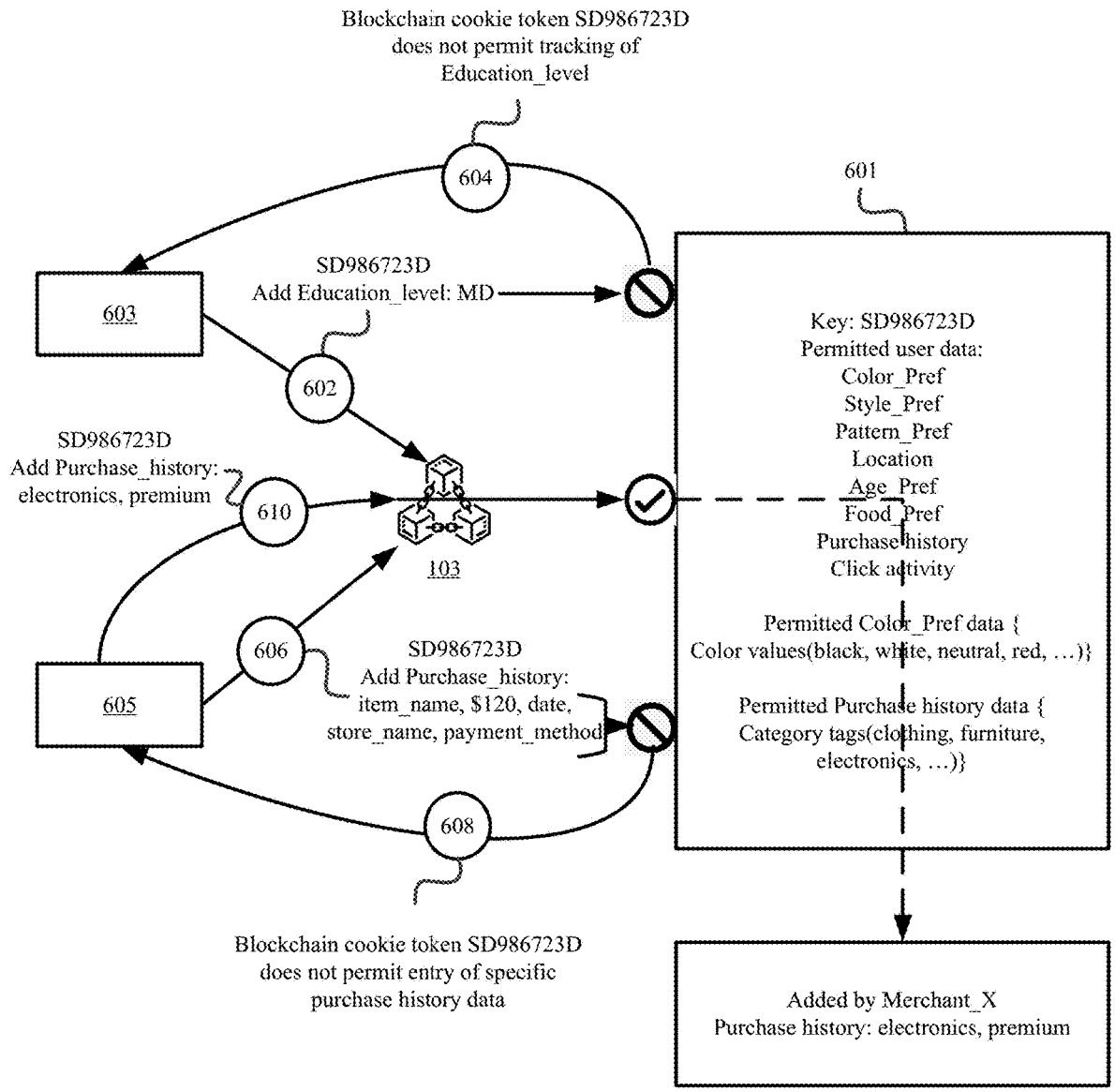
FIG. 6 illustrates an example of a user being able to control the user data that merchants add to the user's blockchain cookie token in accordance with some embodiments presented herein.

FIG. 6 illustrates an example of a user being able to control the user data that merchants add to the user's blockchain cookie token in accordance with some embodiments presented herein. FIG. 6 conceptually illustrates a set of access rules that the smart contract of blockchain cookie token 601 enforces.

First merchant 603 may provide (at 602) the key for blockchain cookie token 601 and a first request to add a tracked education level for the user to blockchain 103. The contents of the first request may be verified against the access rules within blockchain cookie token 601, and the access rules may prevent (at 604) the tracking of the user's education level in blockchain cookie token 601. Accordingly, the first request to add user data to blockchain cookie token 601 may be denied, and/or an error message may be returned to first merchant 603 indicating that the education level is not permitted user data that can be tracked in blockchain cookie token 601.

Second merchant 605 may provide (at 606) the key for blockchain cookie token 601 and a second request to add specific purchase data to blockchain cookie token 601 based on a purchase made by the user. The second request may identify the name of the purchased item, the purchase price, and/or other specific purchase data, but the access rules may prevent (at 608) such specific purchase data from being added to blockchain cookie token 601. Accordingly, the second request to add user data to blockchain cookie token 601 may be denied, and/or an error message may be returned to second merchant 605 indicating that the tracked purchase history cannot contain specific identifying information.

Second merchant 605 may resubmit (at 610) the request with the anonymized or non-identifying purchase data. The anonymized or non-identifying purchase data may satisfy the access rule, and may be added to blockchain cookie token 601. In some embodiments, each added block or user data may include an identifier of the merchant that provided that information.

In some embodiments, the code for the access rules may extract and add only the anonymized or non-identifying purchase data from the original second request to blockchain cookie token 601, or may convert the specific purchase data to non-specific purchase data that may be tracked as part of blockchain cookie token 601. For instance, purchase data from second merchant 605 may identify a particular make and model of a device in a particular electronics category. The access rules may allow entry of a purchase in the particular electronics category to be recorded without specifying the particular make and model. Additional non-identifying information such as the device category (e.g., premium, mid-range, budget, etc.) or the amount of onboard memory may also be added to the blockchain cookie token. The set of preferences included with the second request may also include non-identifying purchase data such as the style and color of the device. Accordingly, a new block may be added to the blockchain and linked to the blockchain cookie token to associate the non-identifying purchase data and the set of preferences to the blockchain cookie token.

By adding the blockchain cookie tokens and the associated user data to blockchain 103, the user data becomes immutably linked to the respective blockchain cookie token. Consequently, one merchant may not outright overwrite or replace user data entered by another merchant. In some embodiments, the user data contained in the blockchain cookie token may be tagged with an identifier of the merchant that added that user data. In this manner, different merchants may add and/or access different values for the same particular user data using the same blockchain cookie token. For instance, a first merchant may determine that the user prefers bright colors, and a second merchant may determine that the user prefers dark colors. The blockchain cookie token may store both preferences with different merchant identifiers so that the different merchants may retrieve the preferences they created or that are relevant to them.

Moreover, by storing the blockchain cookie token on the blockchain, the user data contained within the blockchain cookie token may be accessed anywhere there is a network connection. Different techniques may be used to allow the blockchain cookie token to follow the user as the user moves from one site to another or from one merchant to another. Stated differently, different techniques may be used to automatically provide a user's blockchain cookie token to different sites or merchants that the user visits.

In some embodiments, a user may create an account with each merchant that is to receive access to the blockchain cookie token. The user may link the blockchain cookie token to the account so that whenever the user visits the merchant site, the merchant may automatically access the user data from the linked blockchain cookie token, and may customize the user experience based on the user data.

Figure 7:
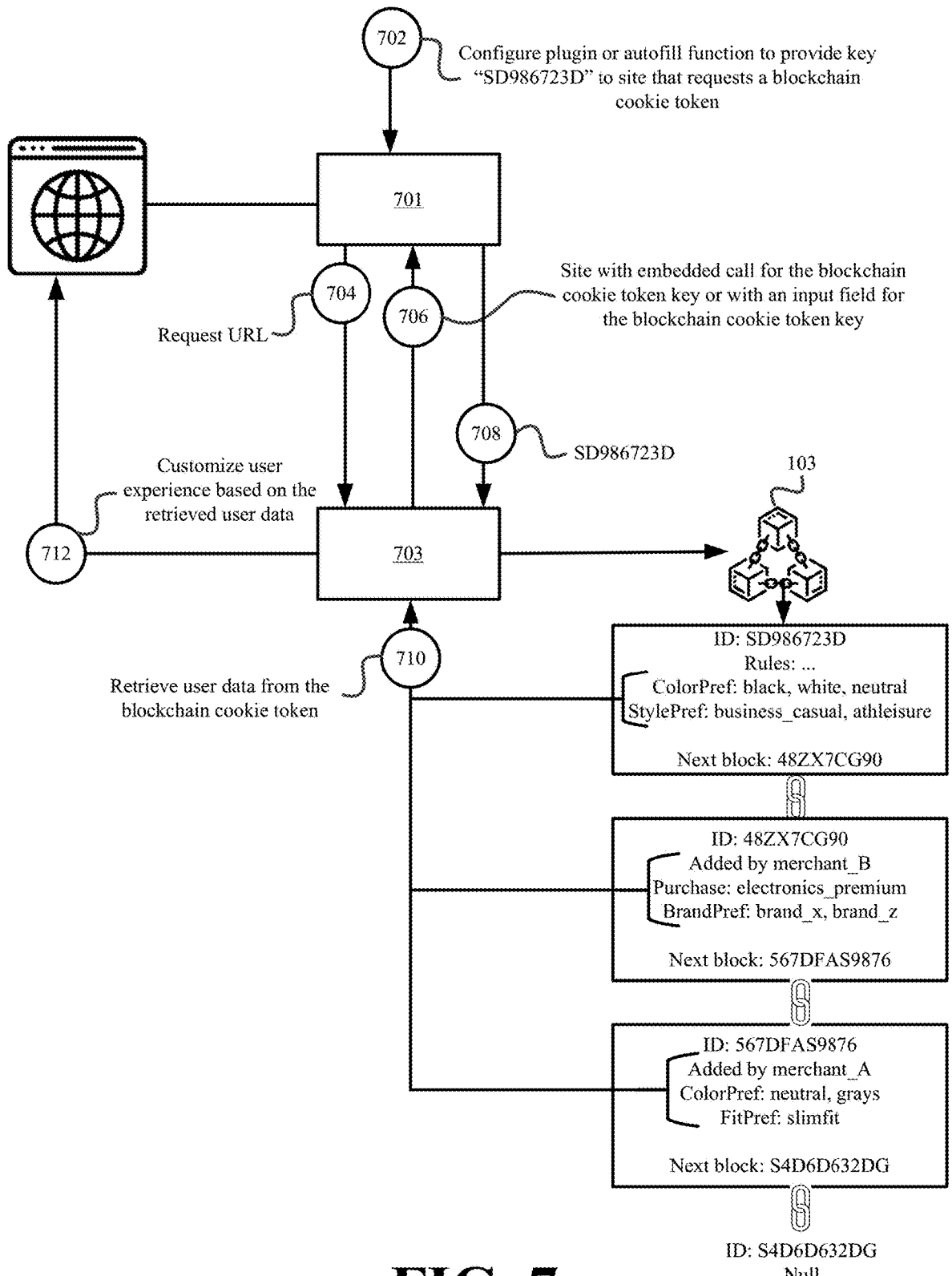
FIG. 7 illustrates an example of automatically accessing the blockchain cookie token at different merchant sites in accordance with some embodiments presented herein.

In some embodiments, autofill functionality of a browser or a plugin may be used to automatically access the blockchain cookie token at different merchant sites. FIG. 7 illustrates an example of automatically accessing the blockchain cookie token at different merchant sites in accordance with some embodiments presented herein.

A user may install a plugin for browser application 701, and may configure (at 702) the plugin with the key of the user's blockchain cookie token. Alternatively, the user may configure (at 702) the autofill function of browser application 701 with the key of the user's blockchain cookie token, and may associate the key with a specific blockchain cookie field or request.

Browser application 701 may navigate to and request (at 704) a particular site using a URL from server 703. Server 703 may return (at 706) the particular site to browser application 701. Embedded within the particular site may be code or a call for the blockchain cookie token. Alternatively, the particular site may include a field that accepts the blockchain cookie token as input.

Browser application 701 may invoke the embedded code or call or may detect the blockchain cookie token field, and may automatically provide (at 708) the key for the user's blockchain cookie token to server 703. Server 703 may use the key to lookup and retrieve (at 710) the user data associated with the first block of the blockchain cookie token and the key for the second block of the blockchain cookie token from blockchain 103. Server 703 may retrieve (at 710) the user data from the second block and the key for the third block of the blockchain cookie token, and may continue in this manner until reaching the reserved key for a future block. Server 703 may customize (at 712) the content presented on the requested site based on the user data retrieved (at 710) from the blockchain cookie token.

In some embodiments, Non-Fungible Tokens ("NFTs") may be linked to the blockchain cookie token to track different states at different merchants, and/or to verify the origin of a particular set of preferences, styling, and/or other user data. For instance, a merchant site may use the user data from the blockchain cookie token to create custom content for the user. The custom content may include the pairing or styling of different items to create a particular outfit, arrangement, or grouping of items. The user may add the particular outfit, arrangement, or grouping of items to the blockchain cookie token. Alternatively, an NFT may be generated for the particular outfit, arrangement, or grouping of items. The NFT may record the state of the particular outfit, arrangement, or grouping of items, and may be linked to the blockchain cookie token of the user so that merchant sites may reference the particular outfit, arrangement, or grouping of items as user data from which similar outfits, arrangements, or groupings of items may be based.

In some embodiments, a user may create their own unique grouping of items at a particular merchant site, and may generate an NFT to verify that they originated the unique grouping. The merchant site may then share that grouping of items with other users, and may use the NFT to attribute credit for the grouping creation to the user or to provide a revenue share to the user for every purchase of that grouping of items.

Figure 8:
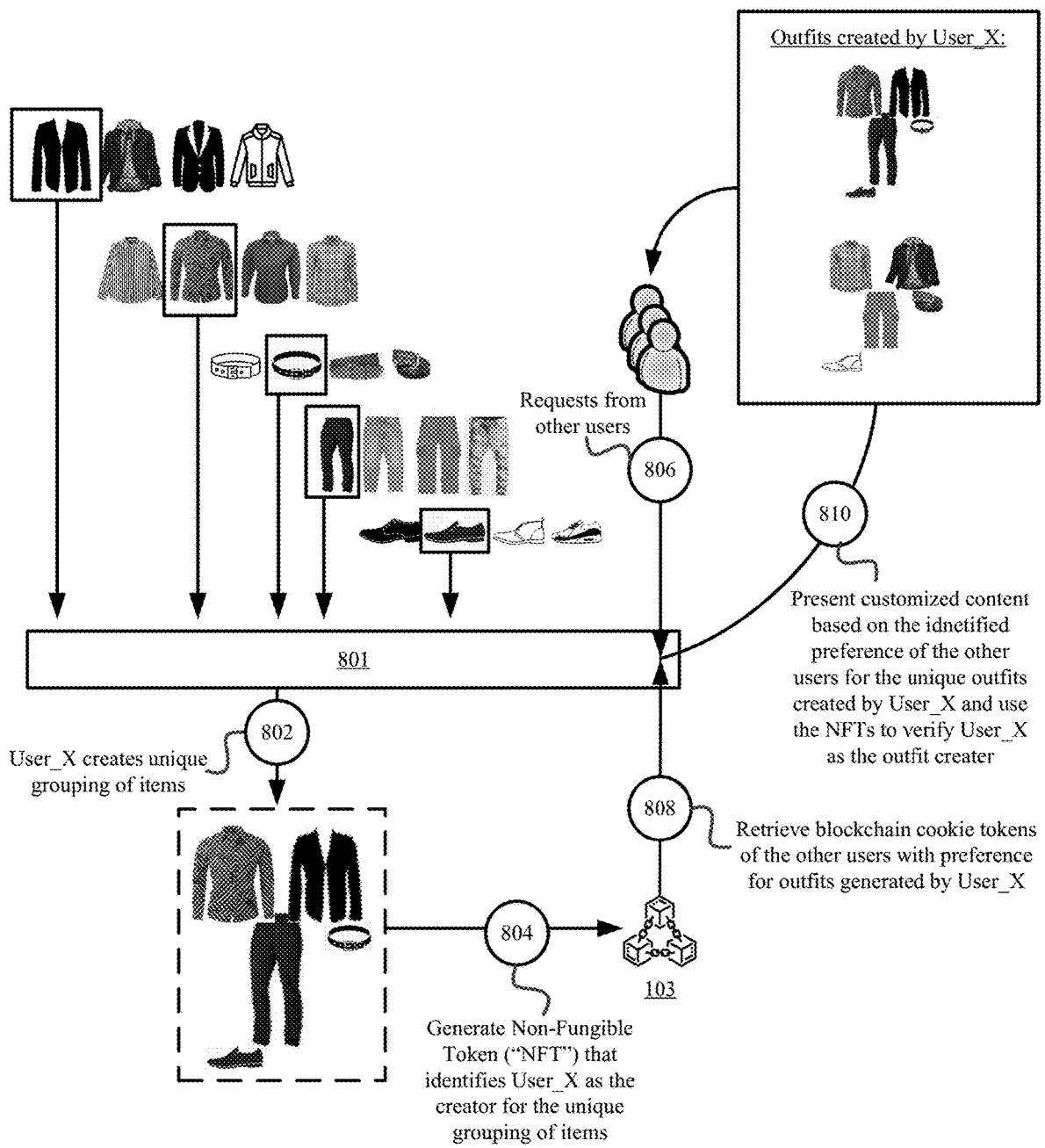
FIG. 8 illustrates an example of associating a Non-Fungible Token ("NFT") to a grouping of items in accordance with some embodiments presented herein.

FIG. 8 illustrates an example of associating an NFT to a grouping of items in accordance with some embodiments presented herein. As shown in FIG. 8, a particular user may interact with merchant site 801 in order to create (at 802) a unique outfit based on a grouping of different items available at merchant site 801. An NFT may be generated (at 804) on blockchain 103 to record the particular user as the creator of the unique outfit. In some embodiments, the NFT may include or be associated with an image of the unique outfit and an identifier of the particular user. In some embodiments, the NFT may be linked to the blockchain cookie token of the particular user.

Other users may access (at 806) merchant site 801. Merchant site 801 may retrieve (at 808) the blockchain cookie tokens of the other users, and may determine that the blockchain cookie tokens of the other users contain a preference for outfits generated by the particular user. Merchant site 801 may then query blockchain 103 for any NFTs that identify the particular user as a creator, may retrieve images of the unique outfits associated with each NFT identifying the particular user as the creator, and may present (at 810) customized content to the other users that includes the images of the unique outfits created by the particular user or links to the individual items within each of the unique outfits. Additionally, merchant site 801 may include the NFT or links to the NFT to verify that the particular user created the unique outfits.

In some embodiments, merchant site 801 may generate the customized content based on the popularity of outfits created by different users and the association of the NFTs. For instance, merchant site 801 may track that items used in outfits created by a particular user are best selling items. Merchant site 801 may designate the particular user as an influencer, may identify other outfits created by that particular user using the NFTs, and may customize the site for other users to include the outfits created by the particular user. In other words, merchant site 801 may identify outfits created by the particular user using the NFTs, and may promote those outfits based on popularity of the items included in the particular user's outfits.

In some embodiments, a merchant site may create NFTs for different groupings of items that the merchant site creates. The merchant site may create the NFTs to differentiate the artistic or stylistic qualities of the merchant site, and to identify other sites that may be copying or stealing the styles created by the merchant site.

Figure 9:
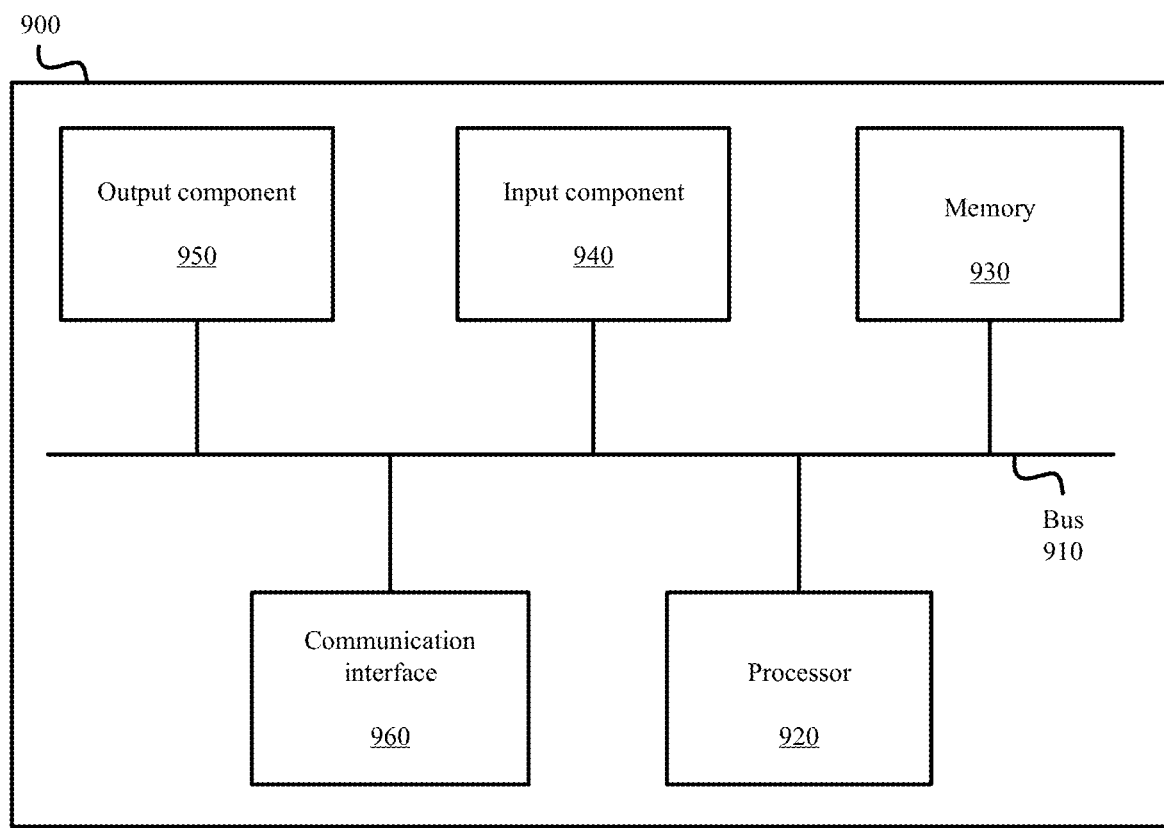
FIG. 9 illustrates example components of one or more devices, according to one or more embodiments described herein.

FIG. 9 is a diagram of example components of device 900. Device 900 may be used to implement one or more of the devices or systems described above (e.g., virtual stylist system 400, blockchain cookie token generation system, user devices, kiosks, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   generating a token for a particular user on a blockchain and a key for accessing the token on the blockchain;
   providing the key to a first network site and a second network site;
   entering a first set of user data by the first network site to the token based on said providing the key to the first network site, the first network site tracking activity of the particular user on the first network site, and the first network site issuing one or more messages to the blockchain that add the set of user data to the token without action from the particular user or messaging from a device of the particular user; and
   customizing content that is presented to the particular user at the second network site based on one or more content from a plurality of content of the second network site having attributes that match the first set of user data entered by the first network site in the token, wherein customizing the content comprises the second network site retrieving the first set of user data from the token in response to providing the key to the second network site and the second network site matching the attributes of the one or more content to the first set of user data.

2. The method of claim 1, wherein generating the token comprises:
   defining a set of rules that restricts different types of user data that different network sites are permitted to enter into the token to a set of supported user data.

3. The method of claim 2 further comprising:
   validating the first set of user data against the set of rules; and
   determining that the first set of user data is within the set of supported user data.

4. The method of claim 3 further comprising:
   receiving a second set of user data from the first network site;
   determining that the second set of user data violates one or more of the set of rules and is not within the set of supported user data; and
   preventing entry of the second set of user data to the token.

5. The method of claim 1 further comprising:
   entering a second set of user data by the second network site to the token based on different activity of the particular user that is tracked by the second network site.

6. The method of claim 5,
   wherein entering the first set of user data comprises generating a first block on the blockchain that stores the first set of user data and that is linked to an origin block that is accessed using the key; and
   wherein entering the second set of user data comprises generating a second block on the blockchain that stores the second set of user data and that is linked to the first block.

7. The method of claim 5 further comprising:
   wherein entering the first set of user data comprises associating a first tag, that identifies the first network site, with the first set of user data; and wherein entering the second set of user data comprises associating a second tag, that identifies the second network site, with the second set of user data.

8. The method of claim 5,
wherein the first set of user data comprises a first set of preferences of the particular user detected by the first network site; and
wherein the second set of user data comprises a different second set of preferences of the particular user detected by the second network site.

9. The method of claim 5 further comprising:
providing the key to a third network site; and
customizing content that is presented to the particular user at the third network site based on the first set of user data entered into the token by the first network site and the second set of user data entered into the token by the second network site.

10. The method of claim 1 further comprising:
associating executable code to the token that controls acceptable user data entered into the token;
receiving a plurality of user data from the first network site; and
wherein entering the first set of user data comprises:
 determining by execution of the executable code that the first set of user data from the plurality of user data comprises the acceptable user data; and
 filtering a second set of user data from the plurality of user data that does not contain the acceptable user data, wherein filtering the second set of user data comprises preventing entry of the second set of user data into the token by execution of the executable code.

11. The method of claim 1 further comprising:
providing the key at a physical store;
comparing inventory of the physical store to the first set of user data;
selecting a set of items from the inventory with attributes that match the first set of user data; and
presenting information about the set of items in the physical store.

12. The method of claim 11, wherein presenting the information comprises:
presenting a location of each item of the set of items in the physical store.

13. The method of claim 1 further comprising:
providing the key at a physical store;
receiving an identifier of a first item selected by the particular user at the physical store; and
selecting at least a second item in the physical store with attributes that match attributes of the first item and the first set of user data.

14. The method of claim 1, wherein entering the first set of user data comprises:
receiving a set of user data containing private or identifying information about the particular user;
generating a modified set of user data by removing the private or identifying information about the particular user based on a set of rules associated with the token; and
storing the modified set of user data as the first set of user data to the token.

15. The method of claim 1,
wherein the first set of user data comprises values for a particular set of user preferences; and
wherein entering the first set of user data comprises storing the first set of user data as a first immutable block of the token.

16. The method of claim 15 further comprising:
determining a change to one or more of the particular set of user preferences based on additional tracked activity of the particular user at the first network site; and
entering a second set of user data comprising different values for the particular set of user preferences as a second immutable block of the token that does not overwrite the first immutable block.

17. The method of claim 15 further comprising:
tracking different values for the particular set of user preferences at the second network site;
entering a second set of user data comprising the different values for the particular set of user preferences as a second immutable block of the token; and
associating the first set of user data to the first network site based on a first identifier of the first network site being entered in the first immutable block, and the second set of user data to the second network site based on a second identifier of the second network site being entered in the second immutable block.

18. A user data tracking system comprising:
one or more hardware processors configured to:
 generate a token for a particular user on a blockchain and a key for accessing the token on the blockchain;
 provide the key to a first network site and a second network site;
 enter a first set of user data by the first network site to the token based on said providing the key to the first network site, the first network site tracking activity of the particular user on the first network site, and the first network site issuing one or more messages to the blockchain that add the set of user data to the token without action from the particular user or messaging from a device of the particular user; and
 customize content that is presented to the particular user at the second network site based on one or more content from a plurality of content of the second network site having attributes that match the first set of user data entered by the first network site in the token, wherein customizing the content comprises the second network site retrieving the first set of user data from the token in response to providing the key to the second network site and the second network site matching the attributes of the one or more content to the first set of user data.

19. A non-transitory computer-readable medium, storing a plurality of processor-executable instructions to:
generate a token for a particular user on a blockchain and a key for accessing the token on the blockchain;
provide the key to a first network site and a second network site;
enter a first set of user data by the first network site to the token based on said providing the key to the first network site, the first network site tracking activity of the particular user on the first network site, and the first network site issuing one or more messages to the blockchain that add the set of user data to the token without action from the particular user or messaging from a device of the particular user; and
customize content that is presented to the particular user at the second network site based on one or more content from a plurality of content of the second network site having attributes that match the first set of user data entered by the first network site in the token, wherein customizing the content comprises the second network site retrieving the first set of user data from the token in response to providing the key to the second network site and the second network site matching the attributes of the one or more content to the first set of user data.

\* \* \* \* \*